United States Patent Office 3,346,487
Patented Oct. 10, 1967

3,346,487
DEFLOCCULATION OF SOLID MATERIALS IN AQUEOUS MEDIUM
Riyad R. Irani and John W. Lyons, St. Louis, Mo., assignors to Monsanto Company, St. Louis, Mo., a corporation of Delaware
No Drawing. Filed June 11, 1965, Ser. No. 463,387
23 Claims. (Cl. 252—8.5)

This is a continuation-in-part of application Ser. No. 251,009, filed Jan. 14, 1963, now abandoned.

This invention relates to aqueous dispersions of finely divided solid materials in a deflocculated condition and methods for their preparation. More particularly this invention relates to the use of alkylenediphosphonic acids and their salts as deflocculating agents for finely divided solid materials in an aqueous slurry.

Many industrial processes today use aqueous suspensions or slurries in which the water is used as the vehicle for transporting the solids. The phenomenon of defloculation, that is, the separation of aggregates into smaller units, plays an important role in the use of slurry systems by altering the flow or rheological properties of the system. There are in use today many and various kinds of deflocculating agents, one class of which, the condensed phosphates, have gained widespread use in such slurry systems as oil well drilling muds, kaolin processing, wet processing of cement, water-base paint pigment suspensions and the like. However, their susceptibility to hydrolysis in aqueous slurry systems is well known, being primarily dependent on the temperature and pH conditions of the system. This limitation sometimes severely restricts their use. As can be appreciated, therefore, a "hydrolytically stable" deflocculating agent would represent an extremely important advancement in this art.

Therefore, it is an object of this invention to provide improved aqueous dispersions of finely divided solid materials in a deflocculated condition.

It is another object of this invention to provide a process for dispersing in a deflocculated condition finely divided solid materials in an aqueous medium by use of a deflocculating agent.

A further object of this invention is to provide a "hydrolytically stable" deflocculating agent for use in dispersing in a deflocculated condition finely divided solid materials in an aqueous medium.

A further object of this invention is to provide an improved deflocculating agent for use in such slurry systems as oil well drilling muds, kaolin processing, wet processing of cement, water-base paint pigment suspensions and the like.

Other objects will become apparent from the detailed description and the claims.

It has now been discovered that aqueous dispersions of finely divided solid materials in a deflocculated condition can be prepared by incorporating therein a minor amount of one or more alkylenediphosphonic acids, or a salt thereof, said acids being of the following general formula:

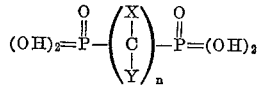

wherein $n$ is an integer from 1–10, X represents hydrogen or lower alkyl (1–4 carbon atoms) and Y represents hydrogen, hydroxyl or lower alkyl (1–4 carbon atoms).

Compounds illustrative of the invention include:

(1) methylenediphosphonic acid, $(OH)_2(O)PCH_2P(O)(OH)_2$ (2) ethylidenediphosphonic acid, $(OH)_2(O)PCH(CH_3)P(O)(OH)_2$ (3) isopropylidenediphosphonic acid, $(OH)_2(O)PCH(CH_2CH_3)P(O)(OH)_2$ (4) 1-hydroxy, ethylidenediphosphonic acid, $(OH)_2(O)PC(OH)(CH_3)P(O)(OH)_2$ (5) hexamethylenediphosphonic acid, $(OH)_2(O)PCH_2(CH_2)_4CH_2P(O)(OH)_2$ (6) trimethylenediphosphonic acid, $(OH)_2(O)P(CH_2)_3P(O)(OH)_2$ (7) decamethylenediphosphonic acid, $(OH)_2(O)P(CH_2)_{10}P(O)(OH)_2$ (8) 1-hydroxy, propylidenediphosphonic acid, $(OH)_2(O)PC(OH)(CH_2CH_3)P(O)(OH)_2$ (9) 1,6 - dihydroxy,1,6 - dimethyl, hexamethylenediphosphonic acid, $(OH)_2(O)PC(CH_3)(OH)(CH_2)_4C(CH_3)(OH)P(O)(OH)_2$

(10) 1,4 - dihydroxy,1,4 - diethyl, tetramethylenediphosphonic acid, $(OH)_2(O)PC(C_2H_5)(OH)(CH_2)_2C(C_2H_5)(OH)P(O)(OH)_2$

(11) 1,3 - dihydroxy,1,3 - dipropyl, trimethylenediphosphonic acid, $(OH)_2(O)PC(C_3H_7)(OH)(CH_2)C(C_3H_7)(OH)P(O)(OH)_2$

(12) 1,4-dibutyl, tetramethylenediphosphonic acid, $(OH)_2(O)PCH(C_4H_9)(CH_2)_2CH(C_4H_9)P(O)(OH)_2$

(13) dihydroxy, diethyl, ethylenediphosphonic acid, $(OH)_2(O)PC(OH)(C_2H_5)C(OH)(C_2H_5)P(O)(OH)_2$

(14) tetrabutyl, butylenediphosphonic acid, $(OH)_2(O)P[CH(C_4H_9)]_4P(O)(OH)_2$

(15) 4-hydroxy,6-ethyl, hexamethylenediphosphonic acid, $(OH)_2(O)PCH_2CH_2CH_2CH(OH)CH_2CH(C_2H_5)P(O)(OH)_2$ Alkylenediphosphonic acids and their salts may be prepared by various means, one of which comprises as a first step the preparation of the corresponding ester by the following general reactions:

(1) For the alkylidenediphosphonic acids and their salts were $n>1$.

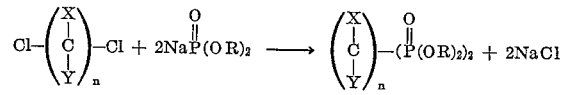

(2) For the alkylidenediphosphonic acids and their salts where $n=1$.

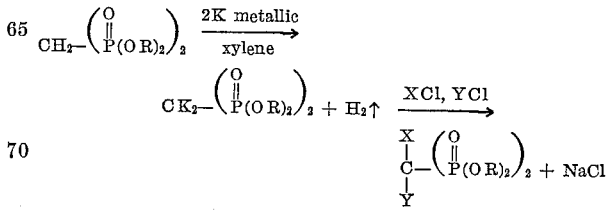

(3) For the alkylenediphosphonic acids and their salts

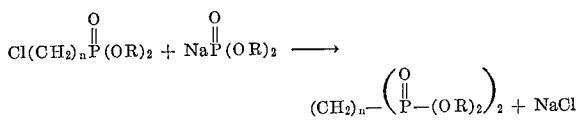

(4) For the 1-hydroxy, alkylenediphosphonic acids and their salts.

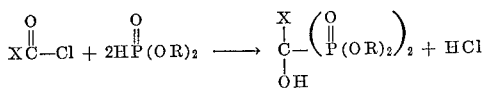

wherein $n$, X and Y are the same as in the foregoing general formula and R represents an alkyl group.

The free alkylenediphosphonic acids and their salts may be prepared by hydrolysis of the ester using strong mineral acids such as hydrochloric acid and the like.

By the term "hydrolytically stable," as used herein, is meant a substantial resistance by the deflocculating agent to hydrolysis or degradation under various pH and temperature conditions. For example, a 20 gram sample of methylenediphosphonic acid, $CH_2(PO_3H_2)_2$, was dissolved in 100 ml. of water. A 25 ml. portion of the solution was added to a 25 ml. portion of 12 M HCl to give a 10% solution of the agent in HCl. Another 25 ml. portion of the solution was added to a 25 ml. portion of 10% NaOH to give a 10% solution of the agent in a 5% solution of NaOH. The foregoing 10% solutions were boiled for a period of four hours, at the end of which both solutions exhibited no change in physical properties. Nuclear magnetic resonance spectra showed the two 10% solutions to be identical with a fresh unheated 10% solution of the agent in water at the same acid and alkaline conditions, thereby establishing the resistance of the agent to hydrolysis or degradation under severe temperature and pH conditions. It should be noted that all known polyphosphates, whether in the acid, salt or ester form, would hydrolyze or degrade completely under the foregoing conditions. Another sample, in this instance 2 grams of tetrasodium methylenediphosphonate, a dry powder, was heated on a thermogravimetric balance. Below a temperature of 300° C. less than 1% weight loss resulted. X-ray diffraction patterns of the heated sample and an unheated sample were identical. As is believed apparent from the foregoing, the deflocculating agent of the instant invention is "hydrolytically stable" and by exhibiting deflocculating properties comparable to the polyphosphates can be used advantageously in many various aqueous slurry applications.

Generally stated, this invention relates to the use of alkylenediphosphonic acids and their salts as improved deflocculating agents for aqueous dispersions of finely divided solid materials and, in addition, this invention also relates to the aqueous slurry compositions resulting therefrom and containing the improved deflocculating agent. It is to be understood that all water soluble salts of alkylenediphosphonic acids are generally suitable for use, and, in particular, the water soluble alkali metal salts, alkaline earth salts, ammonium salt, and amine salts as well as mixed salts of the foregoing, may be used to practice the invention. In particular, amine salts prepared from low molecular weight amines i.e., having a molecular weight below about 300, and more particularly the alkyl amines, alkylene amines and alkanol amines containing not more than 2 amine groups, such as, ethylamine, diethylamine, propylamine, propylenediamine, hexylamine, 2-ethyl hexylamine, N-butylethanol amine, triethanol amine and the like, are the preferred amine salts.

The deflocculating agents of the present invention can be advantageously used for deflocculation purposes with many and various finely divided solid materials which are capable of being dispersed in an aqueous vehicle. Illustrative of such finely divided materials are organic solid materials such as coal including lignite (brown coal), bituminous (soft coal), anthracite (hard coal), charcoal and the like and inorganic solid materials such as various clays, fuller's earth, bauxite, phosphate containing ores, argillaceous materials, calcareous materials, pigments which include ferric oxide, iron blues, red lead, white lead (basic carbonate), white lead (basic sulfate), lead chromate, zinc oxide, zinc chromate, zinc sulfide, lithopone, chromium oxide, titanium dioxide (Anatase), titanium dioxide (Rutile), antimony oxide, cadmium sulfide, lead titanate, extended pigments which include titanium-barium, titanium calcium, zinc sulfide-magnesium or any combinations of pigments used to provide pigments of other than the primary colors which include lead chromate-lead oxide, iron blue and lead chromate, and the like. As being illustrative of the use of the foregoing solid materials in slurry systems are oil well drilling muds, kaolin processing, wet processing of cement, water-base paint pigment suspensions, coal processing and the like. The foregoing solid materials and specific areas of utilizations are by no means the extent of their use, and therefore, the invention is not intended to be limited thereto. The amounts of the deflocculating agent necessary to deflocculate the slurry system in any specific instance depends, inter alia, on the viscosity desired, conditions of use, contaminants and the like, but in any event only minor amounts are usually sufficient, i.e., as little as .01% by weight of solids can give improved results and usually no more than about 1% by weight of solids is necessary in any application. Because it is believed that the ability of the deflocculating agent to deflocculate is enhanced by an increase in the number of phosphonic acid groups which ionize it is preferred that the slurry system be at a pH of 5 or above.

The deflocculating agents of the present invention may be added to the slurry system as an aqueous solution or as a solid in powdered form or it may be incorporated as a dry solid with the substantially dry solid materials prior to being added to the aqueous vehicle. Alternatively, the dispersion and mixing may take place simultaneously by intimately mixing the solid materials with water and the deflocculating agent.

As previously mentioned the deflocculating agent is especially suited for use in kaolin clay slurries. In kaolin processing it is common to find kaoline slurries used in transporting kaolin from the mine to the plant and the processing in the plant may also be performed on the slurries. Customarily the processing is done on a deflocculated-flocculated-redeflocculated slurry system with the redeflocculation or final deflocculation accomplished prior to spray drying or drum drying. In addition, kaolin is sometimes shipped to users in the slurry form. As can be appreciated contaminants in the kaolin, effects of flocculating additives and other agents used in the process, and the variations in temperature encountered are some of the severe conditions placed on the functioning of the deflocculating agent. It is therefore believed appreciated that a deflocculating agent which is relatively hydrolytically stable would be a distinct advantage in kaolin slurry processing.

The amount necessary for the deflocculating agent to deflocculate the kaolin slurry is dependent on many factors, the most important of which is the viscosity desired, however, in any case only a minor amount in the order of about 0.1 to 1% by weight of solids is usually sufficient.

For comparison purposes only deflocculating agents representative of the instant invention were tested along with the widely used polyphosphate deflocculants, i.e., sodium tripolyphosphate, tetrasodium pyrophosphate and sodium hexametaphosphate in a kaolin slurry. The kaolin used in the evaluation was essentially free of impurities and was mixed with distilled water to produce an aqueous slurry with a solids content of about 55%. The initial kaolin slurry had a pH of about 4. The final pH of the slurries after the deflocculating agents had been added varied from about 7 to 8.3 except after adding the deflocculant sodium hexametaphosphate which slurry had a final pH of about 4.5. Viscosity measurements were made in a Stormer viscometer with hollow rotor and cup with side vanes only with apparent viscosity determined at 300 r.p.m. The results of the test are tabulated below:

TABLE I

| Deflocculating Agent | Deflocculating Agent Solids Basis (Percent) | Apparent Viscosity (cp. at 300 r.p.m. on Stormer) |
|---|---|---|
| (1) Tetrasodium pyrophosphate | 0 | Plastic |
|  | .1 | 80 |
|  | .15 | 50 |
|  | .2 | 40 |
|  | .3 | 40 |
|  | .4 | 40 |
| (2) Sodium tripolyphosphate | 0 | Plastic |
|  | .1 | 110 |
|  | .15 | 50 |
|  | .2 | 40 |
|  | .3 | 40 |
|  | .4 | 40 |
| (3) Sodium hexametaphosphate | 0 | Plastic |
|  | .1 | 90 |
|  | .15 | 50 |
|  | .2 | 40 |
|  | .3 | 40 |
|  | .4 | 40 |
| (4) Tetrasodium methylenediphosphonate | 0 | Plastic |
|  | .1 | 1,040 |
|  | .15 | 50 |
|  | .2 | 40 |
|  | .3 | 40 |
|  | .4 | 40 |
| (5) Tetrasodium ethylenediphosphonate | 0 | Plastic |
|  | .1 | 900 |
|  | .15 | 180 |
|  | .2 | 60 |
|  | .3 | 40 |
|  | .4 | 40 |
| (6) Tetrasodium propylenediphosphonate | 0 | Plastic |
|  | .1 | 680 |
|  | .15 | 140 |
|  | .2 | 50 |
|  | .3 | 40 |
|  | .4 | 40 |
| (7) Tetrasodium hexamethylene-diphosphonate | 0 | Plastic |
|  | .1 | 900 |
|  | .15 | 300 |
|  | .2 | 110 |
|  | .3 | 40 |
|  | .4 | 40 |

From the above results it can be observed that in each case the deflocculating agents representative of the instant invention, i.e., (4), (5), (6), and (7) when added in very minor amounts of .1 to about .2 percent by weight on a solids basis effected a dramatic change in the viscosity of the slurry and when used in amounts greater than about .15% were equally as effective as the widely used polyphosphate deflocculating agents, i.e., (1), (2) and (3).

Again for comparative purposes only a deflocculating agent representative of the instant invention was tested along with the widely used polyphosphate deflocculants, i.e., sodium tripolyphosphate and tetrasodium pyrophosphate, in a kaolin slurry. The kaolin used in the evaluation was of a mine grade quality and was mixed with distilled water to produce an aqueous slurry with a solids content of about 70%. The slurry throughout the evaluation was maintained at a pH of about 7 with NaOH. Viscosity measurements were made with the Rotovisco rotational viscometer. The data were converted into apparent Newtonian viscosities the results of which are tabulated at a Newtonian rate of shear to 249 sec.$^{-1}$, a rate which is believed representative for the tests.

TABLE II

| Deflocculating Agent | Deflocculating Agent Solids Basis (percent) | Apparent Viscosity (cp.) |
|---|---|---|
| (1) Sodium tripolyphosphate | 0 | Plastic |
|  | .1 | Plastic |
|  | .2 | 115 |
|  | .25 | 107 |
|  | .3 | 72 |
|  | .35 | 72 |
| (2) Tetrasodium pyrophosphate | 0 | Plastic |
|  | .1 | Plastic |
|  | .2 | 125 |
|  | .25 | 100 |
|  | .3 | 79 |
|  | .35 | 75 |
| (3) 1-hydroxy, ethylidene diphosphonic acid | 0 | Plastic |
|  | .1 | 112 |
|  | .2 | 86 |
|  | .25 | 72 |
|  | .3 | 100 |
|  | .35 | 172 |

From the above results it can be observed that the deflocculating agent representative of the instant invention (3) when added in very minor amounts, i.e., about .1% effected a dramatic change in the viscosity of the slurry while the widely used polyphosphate deflocculants, (1) and (2) were substantially ineffective when used in the same amounts. In addition, it should be noted that deflocculating agent (3) was equally as effective as the polyphosphate deflocculants, (1) and (2) when used in amounts between about .2 and .35%.

As previously mentioned the deflocculating agent is especially suited for use in drilling muds. High temperatures at substantial depths which sometimes reach 250° C., contamination by salt brines or as a result of cementing operations are among the factors which cause undesirable variations in viscosity properties of the muds. The ability of the drilling muds to maintain a suitable viscosity over a wide range of temperature and pH conditions is, therefore, a distinct and important requirement. It can be appreciated that a deflocculating agent which is hydrolytically stable over a wide range of temperature and pH conditions would be extremely well suited for use in drilling muds.

The drilling muds may be comprised of any conventional type material such as hydratable clay or colloidal clay bodies which are capable of being deflocculated or dispersed in an aqueous vehicle. Such clay materials as Wyoming bentonite, commercial medium-yield drilling clays mixed in various parts of the country such as Texas, Tennessee, and Louisiana are among those which are frequently encountered. Weighting material added to increase specific gravity such as barytes, iron oxide, calcium carbonate, silica and the like may also be included. The aqueous vehicle may be any type of suitable fresh or salt water such as is obtained from wells, lakes or the sea. In addition, the drilling muds of the invention may contain other additives, such as caustic soda ash, quebracho, lime, cement, gypsum and the like.

The quantities of the alkylenediphosphonic acids or their salts to be added will vary with, among other things, the properties desired and the type of clay used. Under normal conditions quantities of the deflocculating agent within the range of about .01 to 1% by weight of solids are usually usable.

The alkylenediphosphonic acids or salts can be added directly in the drilling fluid as a dry powder, as a slurry suspended in a suitable liquid, or as a solution in a liquid such as water, and they may be incorporated therein at any convenient point in the mud circulation system. In some cases, it is advantageous to first prepare a substantially dry concentrate by adding the deflocculating agent to the clay and, if desired, the other above-mentioned additives, prior to incorporating such in the aqueous vehicle to prepare the drilling fluid. In such cases the concentrate drilling mud can contain some water (usually below about 10% by weight of the mud solids) such as the normal moisture content of the air dried mud solids. Generally, very little water is desired since the aqueous vehicle is added later when the drilling fluid is prepared.

Aqueous dispersions of other types of finely divided solid materials in a deflocculated condition can be prepared using the alkylenediphosphonic acids or their salts. Such slurry systems as water base paint pigment suspensions, cement slurries and coal slurries can also be improved by the addition of minor amounts of the deflocculating agent.

As can be appreciated, therefore, alkylenediphosphonic acids and their salts are extremely versatile deflocculating agents and it is intended that this invention cover their broad use in aqueous dispersions of finely divided solid materials and the resulting compositions therefrom.

What is claimed is:

1. A slurry comprising an aqueous vehicle containing finely divided solid materials selected from the class consisting of coal and inorganic solid materials selected from the group consisting of clays, bauxite, phosphate-containing ores, cements and pigments, and, as a deflocculating agent to disperse said solid materials into a finely divided dispersion, a compound selected from the group consisting of acids having the formula:

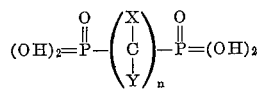

wherein $n$ is an integer from 1 to 10 inclusive, X is a member selected from the group consisting of hydrogen and lower alkyl groups and Y is a member selected from the group consisting of hydrogen, hydroxyl, and lower alkyl groups; and their water soluble salts.

2. A slurry comprising an aqueous vehicle containing inorganic finely divided solid materials selected from the group consisting of clays, bauxite, phosphate-containing ores, cements and pigments, and, as a deflocculating agent to disperse said solid materials into a finely divided dispersion, a compound selected from the group consisting of acids having the formula:

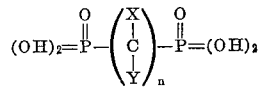

wherein $n$ is an integer from 1 to 10 inclusive, X is a member selected from the group consisting of hydrogen and lower alkyl groups and Y is a member selected from the group consisting of hydrogen, hydroxyl, and lower alkyl groups; and their water soluble salts.

3. The slurry of claim 2, wherein said deflocculating agent is an acid having the formula:

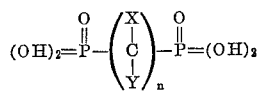

wherein $n$ is an integer from 1 to 10 inclusive, X is a member selected from the group consisting of hydrogen and lower alkyl groups and Y is a member selected from the group consisting of hydrogen, hydroxyl and lower alkyl groups.

4. The slurry of claim 3, wherein said deflocculating agent is methylenediphosphonic acid.

5. The slurry of claim 3, wherein said deflocculating agent is ethylenediphosphonic acid.

6. The slurry of claim 3, wherein said deflocculating agent is 1-hydroxy, ethylidenediphosphonic acid.

7. The slurry of claim 2, wherein said deflocculating agent is a water soluble salt of an acid having the formula:

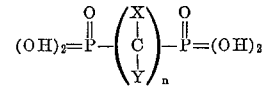

wherein $n$ is an integer from 1 to 10 inclusive, X is a member selected from the group consisting of hydrogen and lower alkyl groups and Y is a member selected from the group consisting of hydrogen, hydroxyl and lower alkyl groups.

8. The slurry of claim 7, wherein said deflocculating agent is tetrasodium methylenediphosphonate.

9. The slurry of claim 7, wherein said deflocculating agent is tetrasodium ethylenediphosphonate.

10. The slurry of claim 7, wherein said deflocculating agent is tetrasodium 1-hydroxy, ethylidenediphosphonate.

11. A kaolin slurry comprising an aqueous suspension of kaolin and, as a deflocculating agent, a compound selected from the group consisting of acids of the formula:

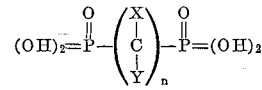

wherein $n$ is an integer from 1 to 10 inclusive, X is a member selected from the group consisting of hydrogen and lower alkyl groups, and Y is a member selected from the group consisting of hydrogen, hydroxyl, and lower alkyl groups; and their water soluble salts.

12. The kaolin slurry of claim 11, wherein said deflocculating agent is present in an amount sufficient to alleviate the tendency of the kaolin particles to flocculate.

13. A method for preparing a kaolin slurry comprising dissolving in an aqueous slurry containing kaolin a deflocculating agent selected from the group consisting of acids of the formula:

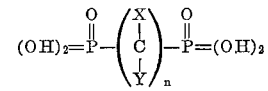

wherein $n$ is an integer from 1 to 10 inclusive, X is a member selected from the group consisting of hydrogen and lower alkyl groups, and Y is a member selected from the group consisting of hydrogen, hydroxyl, and lower alkyl groups; and their water soluble salts.

14. A kaolin slurry comprising an aqueous suspension of kaolin and, as a deflocculating agent, methylenediphosphonic acid.

15. A drilling fluid comprising an aqueous suspension of clay and, as a deflocculating agent, a compound selected from the group consisting of the formula:

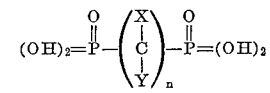

wherein $n$ is an integer from 1 to 10 inclusive, X is a member selected from the group consisting of hydrogen and lower alkyl groups, and Y is a member selected from the group consisting of hydrogen, hydroxyl and lower alkyl groups; and their water soluble salts.

16. The drilling fluid of claim 15, wherein said deflocculating agent is present in an amount sufficient to alleviate the tendency of the clay particles to flocculate.

17. A method for preparing the drilling fluid comprising dissolving in an aqueous slurry containing clay a deflocculating agent selected from the group consisting of acids of the formula:

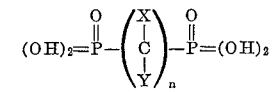

wherein $n$ is an integer from 1 to 10 inclusive, X is a member selected from the group consisting of hydrogen and lower alkyl groups, and Y is a member selected from the group consisting of hydrogen, hydroxyl and lower alkyl groups; and their water soluble salts.

18. A drilling fluid comprising an aqueous suspension of clay and, as a deflocculating agent, methylenediphosphonic acid.

19. A drilling mud concentrate composition useful when incorporated in an aqueous vehicle as a drilling fluid comprising clay, and, as a deflocculating agent, a compound selected from the group consisting of acids having the formula:

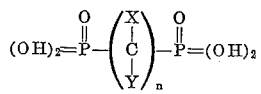

wherein $n$ is an integer from 1 to 10 inclusive, X is a member selected from the group consisting of hydrogen and lower alkyl groups and Y is a member selected from the group consisting of hydrogen, hydroxyl, and lower alkyl groups; and their water soluble salts, said deflocculating agent being present in amounts within the range of about 0.01 to 1 weight percent of said clay.

20. The drilling mud composition of claim 19, wherein said deflocculating agent is 1-hydroxy, ethylidenediphosphonic acid.

21. The drilling mud composition of claim 19, wherein said deflocculating agent is tetrasodium 1-hydroxy, ethylidenediphosphonate.

22. The drilling mud composition of claim 19, wherein said deflocculating agent is methylenediphosphonic acid.

23. The drilling mud composition of claim 19, wherein said deflocculating agent is tetrasodium methylenediphosphonate.

References Cited

UNITED STATES PATENTS

| | | | |
|---|---|---|---|
| 2,137,792 | 11/1938 | Woodstock | 260—500 X |
| 2,286,794 | 6/1942 | Dickey et al. | 260—500 X |
| 2,559,754 | 7/1951 | Bittles et al. | 252—89 X |
| 3,214,454 | 10/1965 | Blaser et al. | 260—500 X |
| 3,234,124 | 2/1966 | Irani | 210—38 |

OTHER REFERENCES

German printed application 1,045,373, Dec. 4, 1957.

LEON D. ROSDOL, *Primary Examiner.*

H. B. GUYNN, *Assistant Examiner.*